Sept. 29, 1936.  L. W. HANCE  2,055,793
PISTON RING
Filed Nov. 23, 1933   2 Sheets-Sheet 1
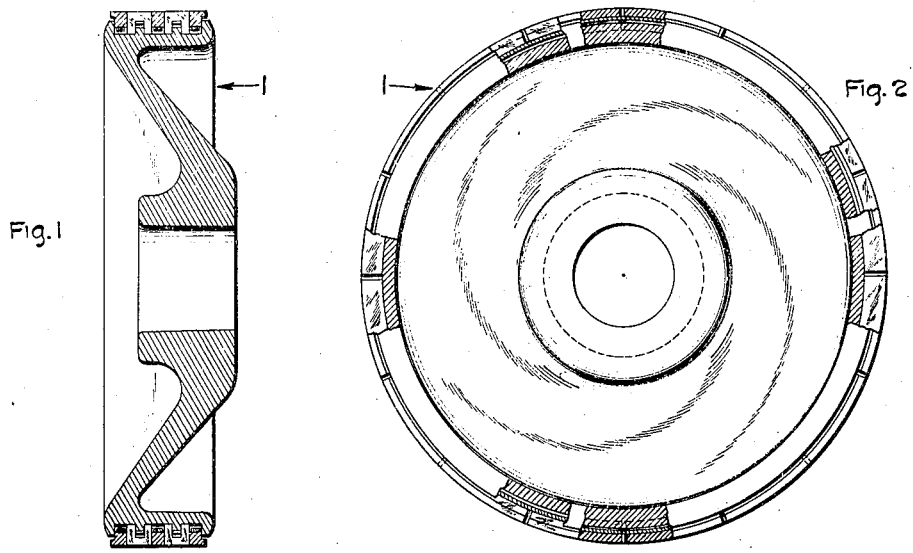
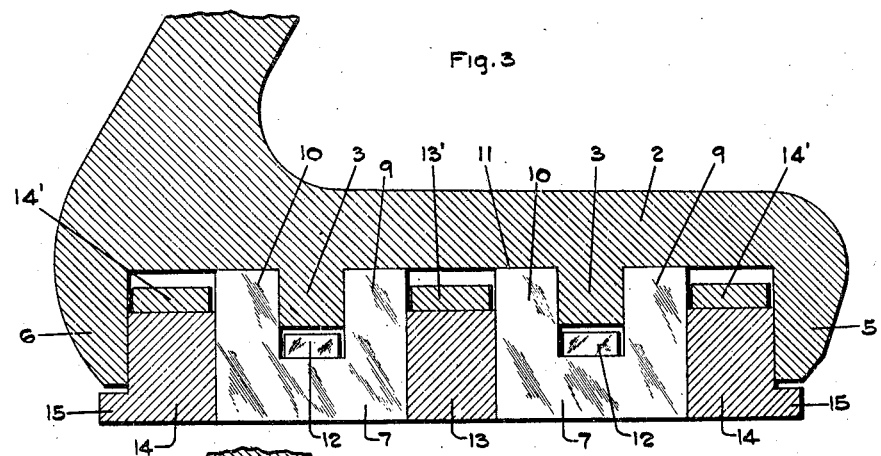
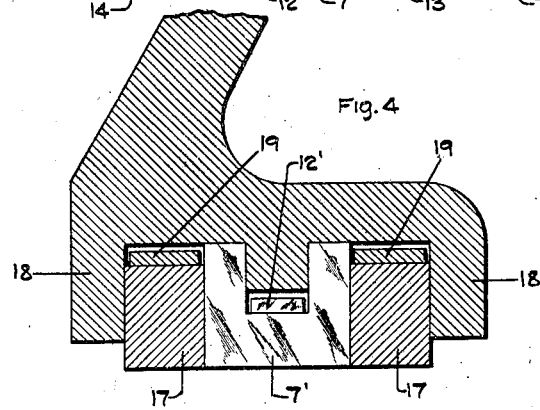
INVENTOR
Lawrence W. Hance
BY
ATTORNEY Sept. 29, 1936.  L. W. HANCE  2,055,793
PISTON RING
Filed Nov. 23, 1933   2 Sheets-Sheet 2
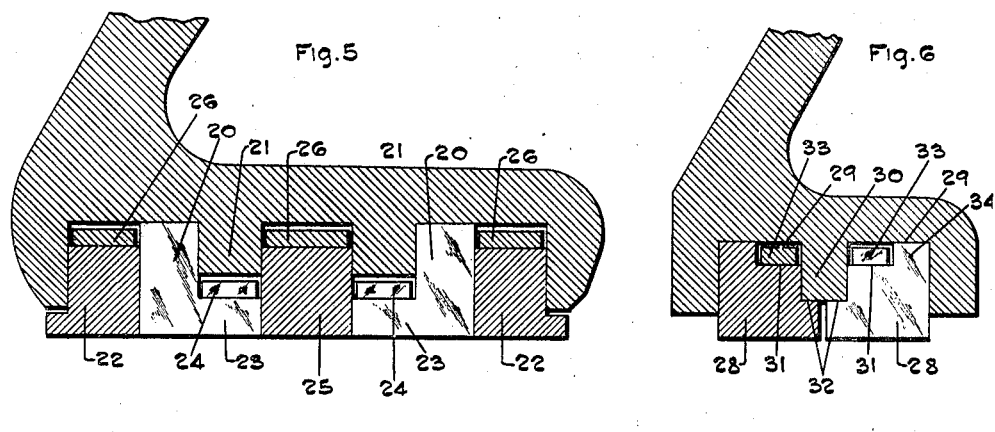
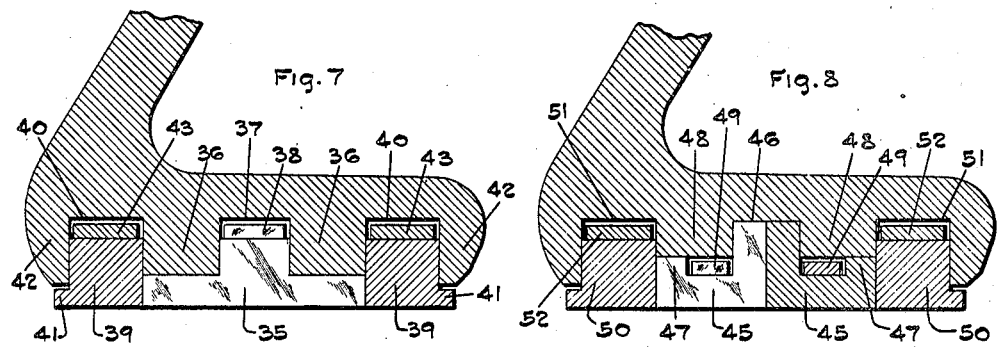
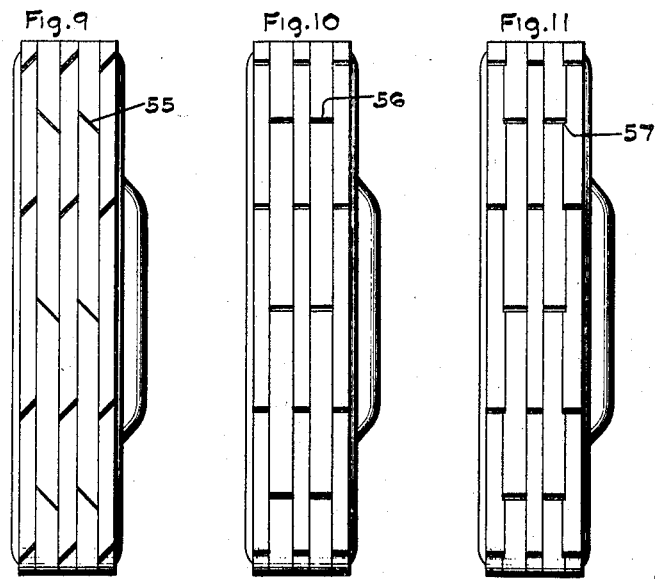
INVENTOR
Lawrence W. Hance
BY
ATTORNEY Patented Sept. 29, 1936

2,055,793

UNITED STATES PATENT OFFICE 2,055,793

PISTON RING

Lawrence W. Hance, Philadelphia, Pa.

Application November 23, 1933, Serial No. 699,421

3 Claims. (Cl. 309—29)

This invention relates generally to piston rings and more particularly to an improved combination of an expansible bull ring and sealing or pressure rings.

Locomotive practice is becoming continually more exacting in its demands for high efficiency and relatively low maintenance costs together with the ability to readily replace or examine working parts. A great many attempts have been made to improve piston rings of both the bull ring and sealing ring types but such attempts are believed to be deficient in many respects.

In my present invention I propose an improved combination of a bull ring and sealing rings whereby the bull ring on its lower half may effectively carry the weight of the piston when reciprocating in a horizontal direction while the upper half of the bull ring may be expanded to partially perform a sealing action, this ring being arranged to directly slidably support sealing rings adjacent thereto, although in certain modifications this is supplemented by the guiding action of flanged surfaces on the piston itself. As a result of my improved arrangement the sectional packing rings are not maintained in a fixed angular relation to each other or to the bull ring, such as is usually done to maintain the ring joints in staggered relation. It is believed that the improved combination herein disclosed results in a very uniform wear of the rings and cylinders, which is of greater value than the mere prevention of leakage through the ring joints that is supposed to be prevented by maintaining the joints in staggered relation, although it is of course to be understood that in certain of these modifications dowel pins may be employed to maintain the staggered relation of the joints if such is desired.

It is one object of my invention to provide an improved combination of a bull ring and sectional sealing ring so constructed and arranged as to accomplish the foregoing and other advantages. Another object is to provide an improved non-interlocking bull ring and sealing rings arranged to permit both sets of rings to be independently yieldably urged outwardly while at the same time assuring that the bull ring will adequately carry the weight of the piston and that the sealing rings will be adequately supported and guided.

A further and more specific object is to provide an improved construction and arrangement of rings whereby they will be economical in manufacture and maintenance and efficient in operation.

Other objects and advantages will be more apparent to those skilled in the art from the following description of the accompanying drawings in which:

Fig. 1 is a diametric sectional view of a piston embodying one of the improved forms of sealing and bull rings;

Fig. 2 is a front view of Fig. 1 with parts broken away to show details of construction;

Fig. 3 is an enlarged fragmentary sectional view of Fig. 1;

Fig. 4 is an enlarged fragmentary sectional view of a modification employing certain features of the Fig. 3 form as applied to a piston having only two rows of sealing rings and one bull ring;

Fig. 5 is a view of a further modification employing an L-shaped bull ring with adjacent sealing rings;

Fig. 6 is a modification wherein a ring is adapted to have direct seating contact with the ring groove so as to permit an effective bull ring function while at the same time permitting a spring to be employed for imparting pressure to the ring for sealing ring purposes together with a ring lip overhanging a portion of a piston flange in co-operation with an adjacent similar ring;

Fig. 7 is a view of a further modification employing a T-shaped bull ring adapted to be directly supported by the piston head although having provision for being yieldably urged;

Fig. 8 is a view of a still further modification of an improved form of expansible bull ring in combination with pressure sealing rings;

Figs. 9 to 11 are elevational views of pistons with rings having various forms of joints which are adapted for use with any of the various forms of rings disclosed herein.

In the illustrated embodiments of the invention such as are shown herein merely for the purpose of disclosing certain specific forms among others that the invention might take, I have shown in Figs. 1 and 2 a piston I which may be of any suitable or desired shape or construction. As shown more particularly in Fig. 3, the piston periphery 2 has a ring groove provided with a pair of intermediate circular flanges 3 and end flanges 5 and 6. A pair of bull rings 7 are identical in construction and are of simple U-shaped cross-section having legs 9 and 10 guided by flange 3 but adapted on the lower side of the piston to seat upon the bottom 11 of the ring groove formed between flanges 5 and 6. The space between legs 9 and 10 is of sufficient radial depth as to receive a circular spring or expander 12 interposed between flange 3 and the bull ring.

Hence it is possible for the ring to directly and adequately support the weight of the piston when disposed for horizontal movement and at the same time the upper side of the bull ring may expand into contact with the cylinder, it being noted that even when the bull ring is in direct contact with the bottom of the ring groove the spring 12 has ample clearance to act freely in its expansive action.

Interposed between the legs of the adjacent bull rings is a simple sealing ring 13 preferably sectional, while a circular spring or expander 13' is interposed between this ring and the groove bottom. There are also provided sealing rings 14 at the ends of the piston periphery 2, these rings preferably being of slightly L-shape due to lips 15 overhanging flanges 5 and 6 in normally spaced relation thereto. This spaced relation is easily maintained because the bull rings 7 prevent movement of the sealing rings inwardly of the outer face of the bull rings. Expander springs 14' are disposed behind rings 14 to urge the same outwardly independently of the radial position of the bull ring.

From the foregoing disclosure it is seen that a relatively simple form of bull ring is provided and due to the arrangement thereof the center sealing ring 13 may be of comparatively simple form and yet effectively guided and supported, throughout any radial movement, by the legs 9 and 10 of the bull rings which in turn are positively supported by direct contact with flanges 3 and the bottom of the ring groove.

In the modification shown in Fig. 4 a single bull ring 7' of the Fig. 3 form is guided by a single intermediate flange while a pair of pressure or sealing rings 17 of simple rectangular cross-section are supported by the legs of bull ring 7' and the two end flanges 18 of a piston. Expander springs 19 are employed with each of the sealing rings and also an expander ring 12' is employed with the bull ring. The advantages of this arrangement are substantially the same as those of Fig. 3.

Fig. 5 is a modification wherein a pair of L-shaped bull rings 20 are guided on one side by intermediate flanges 21 and guided on their other side by contact with pressure sealing rings 22. The peripheral portion 23 of the bull rings is preferably of slightly less thickness than the width of the vertical leg of the L-shaped bull ring. This peripheral portion is sufficiently spaced from flanges 21 to permit ample clearance around an expander spring 24, thus allowing the spring to act freely at all times in expanding the upper half of the bull ring without in any way affecting the direct supporting contact between the lower half of the bull ring and piston. Due to the relatively greater thickness of the radial portion of the vertical leg of the bull ring, there is provided a relatively wide supporting base for the ring to maintain it in proper position although due to the supplemental and mutual guiding and supporting action between the end sealing rings and the adjacent bull rings, a very simple and effective arrangement is provided. A center sealing ring 25 of simple rectangular cross-section is guided by the flanges 21. Expander springs 26 are provided for each of the sealing rings.

In the modification of Fig. 6 a pair of combined bull rings 28 are received in simple ring grooves 29 with an intermediate flange 30. Each of the rings has a pair of offset recesses 31 and 32. An expander spring 33 is freely disposed within recess 31 although the portion 34 of the ring is adapted to have direct supporting contact with the piston. This is also true of that portion of the ring overlying flange 30. From this arrangement it is seen that when the lower half of the ring performs a bull ring function, it is definitely supported at two sides, namely by flange 30 and by the bottom of the ring groove through the ring portion 34. The spring in this case is seated intermediate these two points of support, thus insuring more uniform application of the spring pressure on the upper portion of the ring.

Fig. 7 discloses a further modification wherein a T-shaped bull ring 35 directly supports the piston through its intermediate flanges 36 while the center leg of the ring is disposed within a groove 37. An expander ring 38 is freely disposed in this groove. Sealing rings 39 are disposed in a pair of ring grooves 40 and are provided with lips 41 overhanging the piston flanges 42. Expander springs 43 are freely disposed within grooves 40 to yieldably urge the sealing rings 39 outwardly. An advantage of this arrangement is that the T head of the bull ring engages one side of the sealing rings, thereby forming in effect a continuation of one side of grooves 40 and thus presenting a larger supporting and guiding surface for the sealing rings. Also the bull ring is amply supported over a wide area without reducing the effective cross-sectional area and guiding surface for the sealing rings.

Fig. 8 discloses a further modification wherein a pair of partially U-shaped bull rings 45 have their longer legs disposed in and resting on the bottom of a ring groove 46. The longer legs of rings 45 mutually contact and support each other but are capable of independent radial movement, while the shorter legs 47 are supported directly on intermediate flanges 48. An expander spring 49 is freely disposed in the space between the legs of the bull ring, thereby to impart an expanding force at the center thereof. This insures a balanced pressure on the ring. Sealing rings 50 are disposed in ring grooves 51 and are urged outwardly by expander springs 52. These sealing rings are preferably provided but not necessarily so with small lips overhanging the piston flanges. As a result of this construction, it is seen that the bull rings also have contact with and support the inner sides of the sealing rings 50 and hence provide a high degree of functional and structural coaction between the elements. The rings of all of the figures have right angle portions, one of which constitutes a periphery.

In all of the various modifications it will be understood that both the bull ring and sealing rings are preferably of the sectional and segmental type. In such a case various forms of split joints may be employed for the adjacent ends of the segments. A diagonal joint suitable for this purpose is shown at 55 in Fig. 9 while a plain straight joint is shown at 56 in Fig. 10. A straight joint combined with an offset shoulder 57 is shown in Fig. 11.

I claim:

1. The combination comprising a piston head having end flanges and an intermediate flange thereby forming a plurality of grooves, a U-shaped bull ring having a pair of axially spaced parallel legs connected by a peripheral portion to form an annular recess, said ring being disposed so that said intermediate flange is received in said annular recess and each of said parallel legs being adapted to rest directly on the bottom of said grooves, sealing rings also disposed in said grooves, one of said sealing rings being guided on one side by one of said end flanges and both of said sealing rings being guided by said parallel legs, the bull ring and sealing rings each being radially movable independently of movement of each other, and expander rings disposed beneath said sealing rings and engageable directly with the bottom of said grooves.

2. The combination comprising a piston head having end flanges and a plurality of intermediate flanges thereby forming one more groove than there are number of intermediate flanges, U-shaped bull rings each having a pair of axially spaced parallel legs connected by a peripheral portion to form an annular recess in each ring, each of said interemdiate flanges having one of said bull rings associated therewith and being receivable in the annular bull ring recess whereby the parallel legs of each bull ring are in spaced relation, a sealing ring disposed between one of said end flanges and the leg of the adjacent bull ring and another sealing ring disposed between the other end flange and the leg of the bull ring adjacent thereto, and another sealing ring interposed between the bull ring legs which are adjacent to each other so as to be guided on opposite sides by said legs, said sealing rings and bull rings having slidable engageable straight-sliding surfaces whereby all rings may move radially independently of the movement of the other rings, and expander rings disposed beneath said sealing rings and engageable directly with the bottom of said grooves.

3. The combination set forth in claim 1 further characterized by the provision of an expander ring disposed within the annular recess of the bull ring and supported upon the periphery of said intermediate flange.

LAWRENCE W. HANCE.

CERTIFICATE OF CORRECTION.

Patent No. 2,055,793. September 29, 1936.

LAWRENCE W. HANCE.

It is hereby certified that error appears in the printed specification of the above numbered patent requiring correction as follows: Page 3, second column, line 8, claim 2, for the word "slidable" read mutually; and that the said Letters Patent should be read with this correction therein that the same may conform to the record of the case in the Patent Office.

Signed and sealed this 29th day of December A. D. 1936.

(Seal)

Henry Van Arsdale
Acting Commissioner of Patents.